(12) United States Patent
Ma et al.

(10) Patent No.: US 12,394,056 B1
(45) Date of Patent: Aug. 19, 2025

(54) METHOD AND APPARATUS FOR MONITORING SCANNING ROD STATUS, STORAGE MEDIUM, AND ELECTRONIC DEVICE

(71) Applicant: Shining 3D Tech Co., Ltd., Zhejiang (CN)

(72) Inventors: Chao Ma, Zhejiang (CN); Xiaobo Zhao, Zhejiang (CN); Xiaojun Chen, Zhejiang (CN); Xiaopeng Fu, Zhejiang (CN); Shujuan Xiao, Zhejiang (CN)

(73) Assignee: SHINING 3D TECH CO., LTD., Zhejiang (CN)

( * ) Notice: Subject to any disclaimer, the term of this patent is extended or adjusted under 35 U.S.C. 154(b) by 0 days.

(21) Appl. No.: 19/042,595

(22) Filed: Jan. 31, 2025

(30) Foreign Application Priority Data

Jun. 3, 2024 (CN) .......................... 202410707423.0

(51) Int. Cl.
*G06K 9/00* (2022.01)
*A61C 9/00* (2006.01)
(Continued)

(52) U.S. Cl.
CPC .......... *G06T 7/0014* (2013.01); *A61C 9/0053* (2013.01); *G06T 17/00* (2013.01);
(Continued)

(58) Field of Classification Search
CPC .................. G06T 7/0014; G06T 17/00; G06T 2207/30036; G06T 2207/30168; G06T 2210/41; G06T 2207/10068; G06T 7/0012–0016; G06T 2207/10064–10136; G06T 2207/30004–30104; A61C 9/0053; A61C 9/004; A61C 9/0046; A61B 6/14; A61B 6/145; A61B 5/4547; A61B 5/4542; A61B 1/313–317; A61B 1/00002–00062; A61B 1/267–2676; G06V 2201/03–034
See application file for complete search history.

(56) References Cited

U.S. PATENT DOCUMENTS

2009/0116713 A1\* 5/2009 Yan ........................ G06V 10/449
382/128
2019/0029524 A1\* 1/2019 Kopelman ........... A61B 6/5241
(Continued)

FOREIGN PATENT DOCUMENTS

CN        105513067 A      4/2016
CN        109451721 A      3/2019
(Continued)

OTHER PUBLICATIONS

The search report of the CN patent application No. 202410707423.0, mail date Jul. 9, 2024.
(Continued)

*Primary Examiner* — Atiba O Fitzpatrick
(74) *Attorney, Agent, or Firm* — Scully, Scott, Murphy & Presser, P.C.

(57) ABSTRACT

A method and apparatus for monitoring a scanning rod status, a storage medium, and an electronic device are provided. The method includes: acquiring scanning information of the scanning rod; and updating and acquiring status information of the scanning rod based on the scanning information of the scanning rod to determine status of the scanning rod.

20 Claims, 4 Drawing Sheets

(51) Int. Cl.
*G06T 7/00* (2017.01)
*G06T 17/00* (2006.01)

(52) U.S. Cl.
CPC ............... *G06T 2207/30036* (2013.01); *G06T 2207/30168* (2013.01); *G06T 2210/41* (2013.01)

(56) References Cited

U.S. PATENT DOCUMENTS

| | | | |
|---|---|---|---|
| 2020/0041260 A1 | 2/2020 | Hollenbeck | |
| 2020/0409612 A1 | 12/2020 | Crooks | |
| 2021/0042941 A1* | 2/2021 | Zhen | G06T 7/215 |
| 2023/0149135 A1* | 5/2023 | Lipnik | A61C 9/0053 433/214 |
| 2023/0218374 A1* | 7/2023 | Kaji | A61B 90/361 433/25 |
| 2023/0218375 A1* | 7/2023 | Kaji | A61B 5/0062 433/29 |
| 2024/0122463 A1* | 4/2024 | Li | H04N 23/667 |
| 2024/0257342 A1* | 8/2024 | Semenov | G06T 19/20 |
| 2024/0285379 A1* | 8/2024 | Saphier | A61C 7/002 |

FOREIGN PATENT DOCUMENTS

| | | |
|---|---|---|
| CN | 114138854 A | 3/2022 |
| CN | 116843323 A | 10/2023 |
| JP | 2021003212 A | 1/2021 |

OTHER PUBLICATIONS

Qian Zhao et al. "Using 3D point cloud data technique for nondestructive testing of solid wood panels", Journal of Forestry Engineering, doi: 10. 13360 /j . issn . 2096-1359 . 2018 . 05 . 007.

Liu Xiaoyang et al. "Underwater image saliency detection based on multi-scale", DOI: 10.19358 /j. issn. 1674-7720. 2017. 09. 014.

Arcuri, L. et al., "Influence of Implant Scanbody Wear on the Accuracy of Digital Impressionfor Complete-Arch: A Randomized In Vitro Trial", Materials, Jan. 2022, pp. 1-10, vol. 15, No. 3.

Josef, B., "Vision with Direction-A systematic Introduction to Image Processing and Computer Vision, Direction in 2D", Vision With Direction : A Systematic Introduction To Image Processing and Computer Vision, Jan. 2006, pp. 153-163.

Extended European search report dated May 26, 2025 received in European Patent Application No. 24217119.7.

Office Action dated Jul. 1, 2025 received in Japanese Patent Application No. 2025-092974.

* cited by examiner

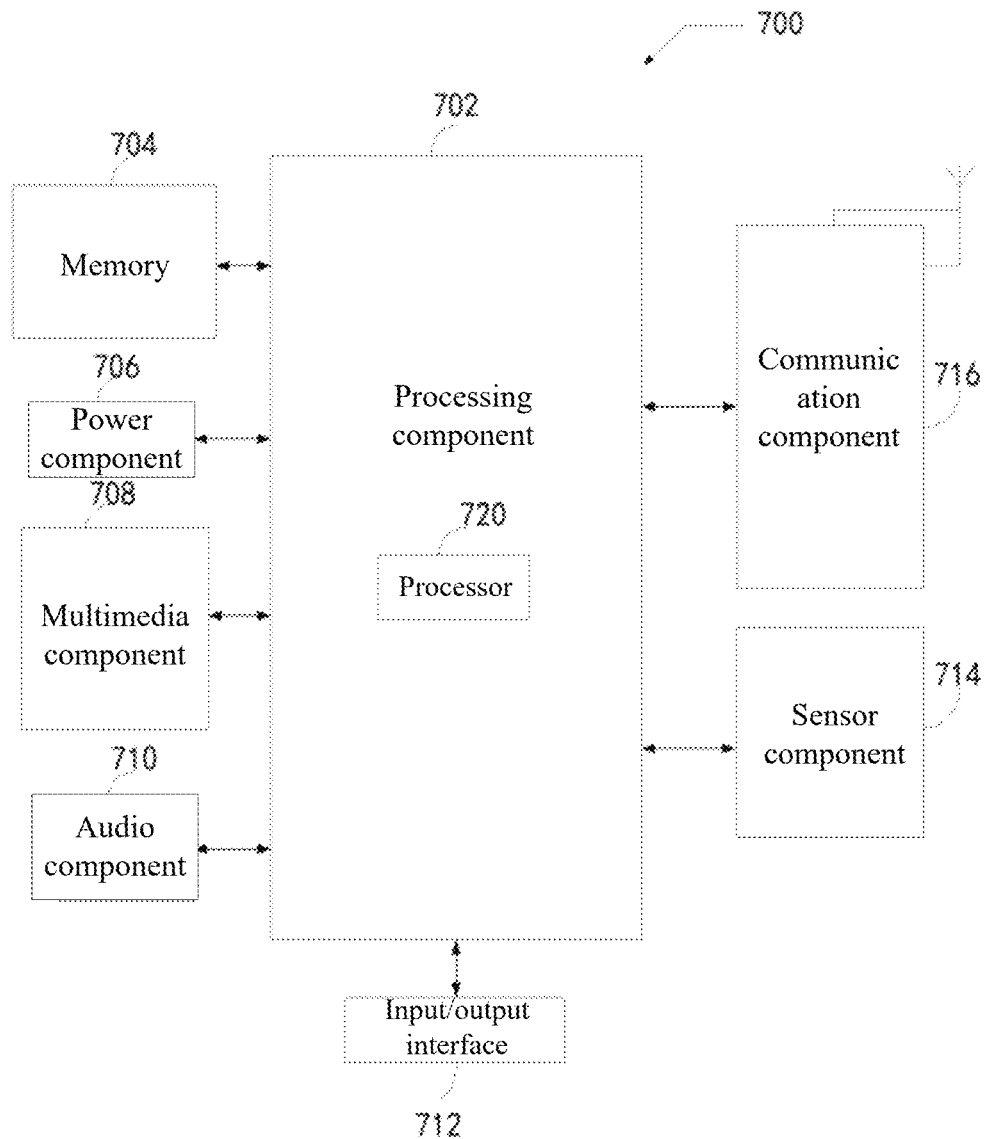

METHOD AND APPARATUS FOR MONITORING SCANNING ROD STATUS, STORAGE MEDIUM, AND ELECTRONIC DEVICE

CROSS-REFERENCE TO RELATED APPLICATION

This application claims priority to Chinese Patent Application No. 202410707423.0, filed to the China National Intellectual Property Administration on Jun. 3, 2024 and entitled "Method and Apparatus for Monitoring Scanning Rod Status, Storage Medium, and Electronic Device", the disclosure of which is hereby incorporated by reference in its entirety.

TECHNICAL FIELD

The present disclosure relates to the technical field of intraoral scanning, specifically to, a method and apparatus for monitoring a scanning rod status, a storage medium, and an electronic device.

BACKGROUND

During the use of an intraoral implant scanning device (referred to as a scanning rod below) in an oral hospital or clinic, it is difficult for a user to have professional knowledge to maintain the scanning rod, and the user also lacks the ability to distinguish the use status and wear of the scanning rod. On the one hand, the use of a scanning rod with excessive wear may result in low accuracy of the data acquired by a scan body during scanning; and on the other hand, incorrect use habits and lack of maintenance may ultimately lead to a decrease in the service life of the scanning rod, resulting in unnecessary waste of procurement costs.

SUMMARY

According to a first aspect, embodiments of the present disclosure provide a method for monitoring a scanning rod status, including:
  acquiring scanning information of the scanning rod; and
  updating and acquiring status information of the scanning rod based on the scanning information of the scanning rod to determine status of the scanning rod.

In some embodiments of the present disclosure, in a possible implementation of the first aspect, the acquiring scanning information of the scanning rod includes:
  scanning the scanning rod through a scanning apparatus in response to a scanning start instruction to acquire image information of the scanning rod; and
  the status information includes: image quality information, and the updating and acquiring status information of the scanning rod based on the scanning information of the scanning rod includes:
  acquiring the image quality information of the scanning rod based on the image information of the scanning rod.

In some embodiments of the present disclosure, in a possible implementation of the first aspect, the status information further includes: image quality warning information; and the method further includes:
  sending the image quality warning information to a user if the image quality information indicates that the status of the scanning rod is abnormal in quality in a process of scanning the scanning rod; and
  displaying the image quality information and the image quality warning information after the scanning is completed.

In some embodiments of the present disclosure, in a possible implementation of the first aspect, the acquiring the image quality information of the scanning rod based on the image information of the scanning rod includes:
  determining the image quality information of the scanning rod based on image clarity of the image information;
  performing reconstruction based on the image information to obtain scanning rod three-dimensional data of the scanning rod; and determining the image quality information of the scanning rod based on the scanning rod three-dimensional data; and/or,
  performing reconstruction based on the image information to obtain identification point three-dimensional data of the scanning rod; and determining the image quality information of the scanning rod based on the identification point three-dimensional data.

In some embodiments of the present disclosure, in a possible implementation of the first aspect, the determining the image quality information of the scanning rod based on image clarity of the image information includes:
  determining a gray value contrast between an identification point and a background region of the scanning rod in the image information, and determining the image clarity of the image information based on the gray value contrast; and/or,
  determining smoothness of an edge line of the identification point of the scanning rod in the image information, and determining the image clarity of the image information based on the smoothness; and
  determining the image quality information of the scanning rod based on the image clarity.

In some embodiments of the present disclosure, in a possible implementation of the first aspect, the determining the image clarity of the image information based on the gray value contrast and the smoothness includes:
  determining a first weight corresponding to the gray value contrast and a second weight corresponding to the smoothness;
  determining a first product of the gray value contrast and the first weight, and a second product of the smoothness and the second weight; and
  taking a sum of the first product and the second product as a clarity value for representing the image clarity.

In some embodiments of the present disclosure, in a possible implementation of the first aspect, the
  determining the image quality information of the scanning rod based on the image clarity includes:
  determining a first comparison result between the clarity value and a preset clarity threshold;
  determining that the image quality information indicates that the scanning rod is normal in quality if the first comparison result indicates that the clarity value is greater than or equal to the clarity threshold; and
  determining that the image quality information indicates that the scanning rod is abnormal in quality if the first comparison result indicates that the clarity value is less than the clarity threshold.

In some embodiments of the present disclosure, in a possible implementation of the first aspect, the determining the image quality information of the scanning rod based on the scanning rod three-dimensional data and the identification point three-dimensional data further includes:
  determining standard three-dimensional data corresponding to the scanning rod pre-stored in a scanning rod database, where the standard three-dimensional data includes: standard scanning rod three-dimensional data for representing a surface profile of the scanning rod, and standard identification point three-dimensional data for representing an identification point of the scanning rod;

respectively comparing the scanning rod three-dimensional data with the standard scanning rod three-dimensional data, and the identification point three-dimensional data with the standard identification point three-dimensional data to obtain a three-dimensional coordinate deviation value; and determining the image quality information of the scanning rod based on the three-dimensional coordinate deviation value.

In some embodiments of the present disclosure, in a possible implementation of the first aspect, the determining the image quality information of the scanning rod based on the three-dimensional coordinate deviation value includes:

determining a second comparison result between the three-dimensional coordinate deviation value and a preset deviation value threshold;

determining that the image quality information indicates that the scanning rod is abnormal in quality if the second comparison result indicates that the three-dimensional coordinate deviation value is greater than or equal to the deviation value threshold; and determining that the image quality information indicates that the scanning rod is normal in quality if the second comparison result indicates that the three-dimensional coordinate deviation value is less than the deviation value threshold.

In some embodiments of the present disclosure, in a possible implementation of the first aspect, the method further includes:

acquiring a use record of the scanning rod, where the use record is inputted by a user through an input device, acquired before the scanning rod is scanned and/or in a process of scanning the scanning rod;

acquiring use frequency of the scanning rod based on the use record; and determining the status information of the scanning rod based on the use frequency of the scanning rod.

In some embodiments of the present disclosure, in a possible implementation of the first aspect, the determining the status information of the scanning rod based on the use frequency of the scanning rod includes:

determining a first comparison result between the use frequency and a preset use frequency threshold;

determining that the status of the scanning rod is normal in quality if the first comparison result indicates that the use frequency is less than the preset use frequency threshold; and determining that the status of the scanning rod is abnormal in quality if the first comparison result indicates that the use frequency is greater than or equal to the preset use frequency threshold.

In some embodiments of the present disclosure, in a possible implementation of the first aspect, the acquiring scanning information of the scanning rod further includes:

regularly monitoring the scanning rod according to a preset self-check period through the scanning apparatus in response to a first instruction to obtain self-check scanning information, and updating and acquiring the status information of the scanning rod based on the self-check scanning information of the scanning rod to determine the status of the scanning rod, where the first instruction is used for indicating the scanning apparatus to monitor the status of the scanning rod based on a regular self-check mode.

In some embodiments of the present disclosure, in a possible implementation of the first aspect, the acquiring scanning information of the scanning rod further includes:

regularly monitoring the scanning rod according to a preset polling period through the scanning apparatus in response to a second instruction to obtain polling scanning information, where the second instruction is used for indicating the scanning apparatus to scan the scanning rod based on a regular polling mode, monitoring items of the regular polling mode are more than monitoring items corresponding to the regular self-check mode, and a monitoring period corresponding to the preset polling period is different from a monitoring period corresponding to the preset self-check period.

In some embodiments of the present disclosure, in a possible implementation of the first aspect, the method further includes:

sending warning information to a user in a case that it is determined that the status of the scanning rod is abnormal in quality, where the abnormal in quality is used for representing that current status of the scanning rod does not reach a preset status standard.

In some embodiments of the present disclosure, in a possible implementation of the first aspect, the method further includes:

setting a wear maintenance process based on the scanning rod, where the wear maintenance process is used for maintaining expected wear or faults of the scanning rod under preset conditions, and maintenance includes at least one of the following: device detection, repair, replacement of parts, and replacement of the scanning rod; and triggering and starting the wear maintenance process in a case that it is determined that the status of the scanning rod is abnormal in quality.

In some embodiments of the present disclosure, in a possible implementation of the first aspect, the method further includes:

displaying the status information through a client of a user in response to a status information display instruction of the user.

According to a second aspect, embodiments of the present disclosure further provide an apparatus for monitoring a scanning rod status, including:

a first unit, configured to acquire scanning information of the scanning rod; and a second unit, configured to update and acquire status information of the scanning rod based on the scanning information of the scanning rod to determine status of the scanning rod.

The second aspect and any one of implementations of the second aspect respectively correspond to the first aspect and any one of implementations of the first aspect. Technical effects corresponding to the second aspect and any one of implementations of the second aspect can refer to technical effects corresponding to the first aspect and any one of implementations of the first aspect mentioned above, which will not be repeated here.

According to a third aspect, embodiments of the present disclosure provide an electronic device, including: a memory, a processor, and a computer program stored in the memory and configured to be run on the processor. The processor, when executing the computer program, implements any one of the methods.

According to a fourth aspect, embodiments of the present disclosure provide a computer-readable storage medium. The computer-readable storage medium stores a computer program, and the computer program, when executed by a processor, implements any one of the methods.

According to a fifth aspect, embodiments of the present disclosure provide a computer program product. The computer program product, when run on an electronic device, causes the electronic device to execute any one of the methods in the above first aspect.

It should be understood that, for beneficial effects of the second aspect to the fifth aspect, reference may be made to the relevant description in the first aspect, and details are not described herein again.

BRIEF DESCRIPTION OF THE DRAWINGS

In order to more clearly illustrate the technical solutions in embodiments of the present disclosure, the accompanying drawings required for description in the embodiments or the related art will be briefly described below. It is apparent that the accompanying drawings in the following description are only some embodiments of the present disclosure. Those of ordinary skill in the art can also obtain other accompanying drawings according to these accompanying drawings without creative work.

FIG. 7 is a schematic structural diagram of an electronic device provided in some embodiments of the present disclosure.

DETAILED DESCRIPTION OF EMBODIMENTS

Figure 1:
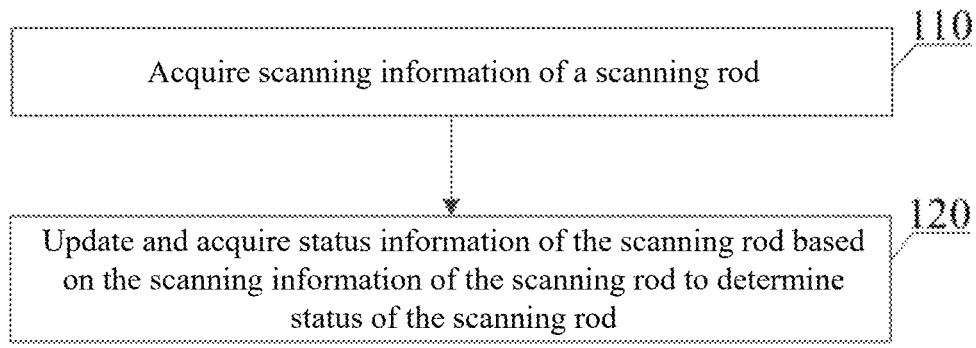
FIG. 1 is a schematic flow chart of a method for monitoring a scanning rod status provided in some embodiments of the present disclosure.

In the following description, specific details such as particular system structures and technologies are provided for illustration purposes rather than limitation to thoroughly understand the embodiments of the present disclosure. However, it should be clear to those skilled in the art that the present disclosure can also be implemented in other embodiments without these specific details. In other cases, detailed descriptions of well-known systems, apparatuses, circuits, and methods are omitted to prevent unnecessary details from obstructing the description of the present disclosure.

It should be understood that when used in the specification and appended claims of the present disclosure, the term "comprise/include" indicates the presence of the described features, integrals, steps, operations, elements, and/or components, but does not exclude the presence or addition of one or more other features, integrals, steps, operations, elements, components, and/or sets thereof.

It should also be understood that the term "and/or" used in the specification and appended claims of the present disclosure refers to any combination and all possible combinations of one or more items listed in association, and includes these combinations.

As used in the specification and appended claims of the present disclosure, the term "if" may be interpreted as "when", "once", "in response to a determination", or "in response to detection" depending on the context. Similarly, the phrase "if determined" or "if [a described condition or event] is detected" may be interpreted as meaning "once determined", "in response to a determination", "once [the described condition or event] is detected", or "in response to detection of [the described condition or event]" depending on the context.

In addition, in descriptions of the specification and appended claims of the present disclosure, terms such as "first", "second", and "third" are merely used for distinguishing descriptions, but cannot be understood as an indication or implication of relative importance.

Reference to "an embodiment" or "some embodiments" described in the specification of the present disclosure means that a specific characteristic, structure or feature described in combination with this embodiment is included in one or more embodiments of the present disclosure. Therefore, the statements "in an embodiment", "in some embodiments", "in some other embodiments", "in further some embodiments", or the like in the differences in the specification do not necessarily refer to the same embodiment, but mean "one or more but not all embodiments", unless otherwise specially emphasized in other ways. The terms "include", "contain", "have", and variants thereof all mean "include but not limited to", unless otherwise specifically emphasized.

First, some of the terms used in the embodiments of the present disclosure are explained to facilitate the understanding of those skilled in the art.

Scan body: In dental implant management, a scanning rod is usually a medical instrument for scanning dental implants (i.e., artificial tooth roots), intraoral scanning devices, teeth, or other structures in the oral cavity, so as to acquire digital oral data such as three-dimensional models and X-ray images.

Dental implant: It is an artificial plant for replacing missing teeth or tooth roots, is usually made of titanium alloy or ceramic, and is one of important treatment methods in oral implantology.

The terms involved in the embodiments of the present disclosure are briefly introduced above and will not be repeated below.

In the technical field of oral medicine, for example, in a tooth implantation case, an implant is implanted at the site of tooth loss in the oral cavity of a patient, and an intraoral implant scanning device (referred to as a scanning rod below) is installed on the implant and is usually connected to the implant through an abutment. By using an oral digital impression machine (referred to as a scan body below) to scan the oral cavity of the patient, the installation position information of the scanning rod and the shape of the surrounding tissue can be determined to facilitate the subsequent design and installation of dentures.

It should be understood that scanning rods are usually relatively durable under normal use, but may still be affected and then damaged. For example, if a dentist or technician has a maloperation during the use of a scanning rod, such as overly rough operation or failure to follow the usage guidelines of manufacturers, it may cause device damage. For another example, the scanning rod may be accidentally impacted during use, and especially in a narrow oral space, it may cause damage to the structure or optical components of the scanning rod. In addition, incorrect cleaning and maintenance may also cause damage or dirt of the scanning rod. The above problems may easily affect the use status of the scanning rod, consequently leading to a decrease in the accuracy of the scanning data acquired by the scan body. Therefore, it is necessary to monitor and manage the status of the scanning rod to discover potential problems that may exist in time.

In order to solve the above problems, and in order to prolong the service life of the scanning rod to the maximum extent, it is necessary to monitor and manage the status of the scanning rod to discover potential problems that may exist in time, thereby ensuring that the data of the scanning rod acquired by the scan body during scanning meets the requirements. Embodiments of the present disclosure provide a method for monitoring a scanning rod status. As an example and not a limitation, the method can be applied to the above electronic device. A scanning rod management system may specifically be run in the electronic device to provide a display interface for user interaction. The electronic device may be a terminal, a server, or other devices. In some embodiments, the server may also be implemented in the form of a terminal.

The server may be an independent physical server, or a server cluster or distributed system composed of a plurality of physical servers, or a cloud server that provides basic cloud computing services, such as cloud services, cloud databases, cloud computing, cloud functions, cloud storage, network services, cloud communications, middleware services, domain name services, safety services, content delivery networks (CDNs), big data and artificial intelligence platforms.

The terminal may be a smart phone, a tablet computer, a laptop computer, a desktop computer, a smart speaker, a smart watch, or the like, but is not limited thereto. The terminal and the server may be directly or indirectly connected in a wired or wireless communication mode, which is not limited in the present disclosure.

Detailed descriptions are respectively provided below. It should be noted that the serial number of the following embodiments does not serve as a limitation on the preferred order of the embodiments.

Referring to FIG. 1, FIG. 1 shows a schematic flow chart of a method for monitoring a scanning rod status provided in the present disclosure. Embodiments of the present disclosure provide a method for a monitoring scanning rod status, including:

S110: scanning information of the scanning rod is acquired; and

S120: status information of the scanning rod is updated and acquired based on the scanning information of the scanning rod to determine status of the scanning rod.

It should be understood that in examples of the present disclosure, the method can be executed in a scanning rod management system (intraoral implant scanning rod management system or scanning rod management software program), suitable for managing intraoral scanning rods used in the field of oral medicine.

It should be understood that in the field of the oral technology, a scanning rod is specifically used in conjunction with a scan body. For example, in a tooth implantation case, an implant is implanted at the site of tooth wear in the oral cavity of a patient, and the scanning rod is installed on the implant and is usually connected to the implant through an abutment. By using the scan body to scan the oral cavity of the patient, the installation position information of the scanning rod and the shape of the surrounding tissue can be determined to facilitate the subsequent design and installation of dentures.

Embodiments of the present disclosure provide a method for monitoring a scanning rod status. The method can update and determine status of the scanning rod by acquiring and analyzing the scanning information of the scanning rod. In a specific implementation scene, when a dentist or technician uses a scan body to scan a scanning rod in the oral cavity of a patient, a scanning rod management system acquires scanning information of the scanning rod, which may include but is not limited to: use time, use frequency, performance data of the scanning rod in a scanning process, or the like.

Based on the acquired scanning information of the scanning rod, the scanning rod management system updates or refreshes the status information of the scanning rod to monitor any possible signs of performance degradation or faults of the scanning rod. Specifically, the surface dirt, wear degree, damage, and expected service life of the scanning rod can be evaluated by analyzing the scanning information of the scanning rod, thereby finally determining whether current status of the scanning rod is normal in operation or requires maintenance.

The embodiments of the present disclosure can monitor working status of the scanning rod in real time and discover potential problems in time, and can also remind users to take corresponding maintenance measures to ensure normal operation and service life of the scanning rod, thereby significantly improving the quality and safety of medical services.

In some embodiments of the present disclosure, the scanning rod management system displays the status information of the scanning rod on a client of a user in response to a status information display instruction of the user, so that the user can understand the status information of the scanning rod in time.

It should be understood that the scanning rod management system is a comprehensive software system for effectively managing and maintaining scanning rods. The scanning rod management system is usually composed of a back-end server, a database, and a front-end client. The client usually refers to an application or software interface used by a user. The user in the scanning rod management system can access and operate various functions of the system through the client. For example, the user can view the use record, status information, or the like of the scanning rod.

In some embodiments of the present disclosure, the process of acquiring scanning information of the scanning rod further includes: the scanning rod is scanned through a scanning apparatus in response to a scanning start instruction to acquire image information of the scanning rod.

In some embodiments of the present disclosure, the status information of the scanning rod includes: image quality information. The process of updating and acquiring status information of the scanning rod based on the scanning information of the scanning rod includes: image quality information of the scanning rod is acquired based on the image information of the scanning rod.

In some embodiments of the present disclosure, in response to the scanning start instruction, the scanning rod management system indicates to scan the scanning rod through a scanning apparatus (i.e., an oral digital impression machine or an intraoral scan body) to acquire image information of the scanning rod. The scanning rod management system analyzes image quality information such as clarity, contrast and resolution based on the acquired image information of the scanning rod to evaluate current status of the scanning rod, thereby updating status information of the scanning rod.

Through the above method, the current status of the scanning rod can be more accurately monitored. Especially, whether the scanning rod is dirty, worn, defective, dropped, deformed or damaged is judged through the image quality information, thereby providing a scientific basis for the maintenance and replacement of the scanning rod.

In some embodiments of the present disclosure, the status information of the scanning rod further includes: image quality warning information. The method further includes:
  the image quality warning information is sent to a user if the image quality information indicates that the status of the scanning rod is abnormal in quality in a process of scanning the scanning rod; and
  the image quality information and the image quality warning information are displayed after the scanning is completed.

In some embodiments of the present disclosure, the image quality warning information can be understood as a piece of specific status information for notifying and reminding the user to process the scanning rod in time when the image quality of the scanning rod does not meet the predetermined standards. In some embodiments of the present disclosure, the image quality warning information can be sent to the user through visual or auditory signals, email, application notification, and other ways.

If the image quality information indicates that the status of the scanning rod is abnormal in quality, that is, the image quality information shows that the performance of the scanning rod is lower than the normal level, or there are faults, such as blurred identification points, dirt or damage signs, the scanning rod management system will automatically send the image quality warning information to the user so as to notify the user to take necessary maintenance measures for the scanning rod in time.

After the photographing or scanning process of the scanning rod is completed, the scanning rod management system can not only display the image quality information, but also display any image quality warning information generated based on the scanning process, so that after the scanning process for the scanning rod is completed, the user can immediately know the status information of the scanning rod and any quality problems of the scanning rod that need attention.

Through the above example, in the process of scanning the scanning rod, if the image quality information indicates that the status of the scanning rod is abnormal in quality, after the scanning is completed, the user can be informed of the image quality information and image quality warning information about the scanning rod in time, so that the user can take corresponding actions according to the image quality warning information, such as maintenance or replacement of the scanning rod, so as to ensure the reliability of the intraoral scanning rod and enhance the scanning accuracy of the scan body for scanning the scanning rod.

In some embodiments of the present disclosure, embodiments of the present disclosure also describe a specific method for acquiring the image quality information of the scanning rod from the image information of the scanning rod. In some embodiments of the present disclosure, any method can be used, or two methods can be used simultaneously.

Method 1: Image quality information of the scanning rod is determined based on image clarity of the image information.

It should be understood that the image clarity serves as an important index for evaluating image quality, and the scanning rod management system will analyze the clarity of the image of the scanning rod, for example, evaluate the contrast, sharpness and visibility of details of the image, thereby judging whether the image quality of the scanning rod meets the expected standards based on the clarity of the image of the scanning rod.

Method 2: Reconstruction is performed based on the image information to obtain scanning rod three-dimensional data of the scanning rod; and image quality information of the scanning rod is determined based on the scanning rod three-dimensional data.

Method 3: Reconstruction is performed based on the image information to obtain identification point three-dimensional data of the scanning rod; and image quality information of the scanning rod is determined based on the identification point three-dimensional data.

A three-dimensional model of the scanning rod is reconstructed based on image information, for example, implemented by a stereoscopic vision algorithm or point cloud construction technology. The three-dimensional model of the scanning rod obtained by reconstruction includes three-dimensional data of the scanning rod and three-dimensional data of identification points on the scanning rod. Then, image quality information of the scanning rod is determined based on the scanning rod three-dimensional data and/or the identification point three-dimensional data, that is, image quality of the scanning rod is evaluated based on the scanning rod three-dimensional data and/or identification point three-dimensional data obtained by reconstruction. For example, by comparing the consistency between the scanning rod three-dimensional data and/or identification point three-dimensional data and standard three-dimensional data (standard model/expected model) in a scanning rod database, the integrity and accuracy of the three-dimensional model of the scanning rod obtained by reconstruction can be determined. In an example of the present disclosure, by comprehensively utilizing the image clarity and the three-dimensional model of the scanning rod, the image quality of the scanning rod is evaluated and determined, thereby being favorable for improving the status monitoring accuracy of the scanning rod in the field of oral medicine.

Figure 2:
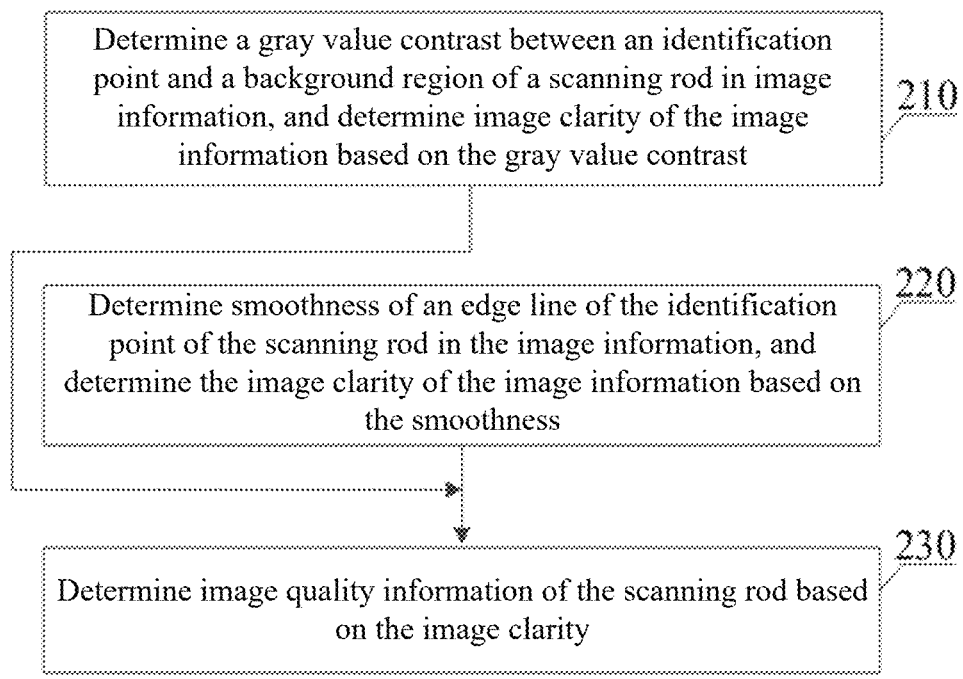
FIG. 2 is a schematic flow chart of an alternative method for monitoring a scanning rod status provided in some embodiments of the present disclosure.

Referring to FIG. 2, FIG. 2 shows a schematic flow chart of a method for monitoring a scanning rod status provided in the present disclosure. In some embodiments of the present disclosure, the process of determining image quality information of the scanning rod based on image clarity of the image information includes:
  S210: a gray value contrast between an identification point and a background region of the scanning rod in the image information is determined, and the image clarity of the image information is determined based on the gray value contrast; and/or,
  S220: smoothness of an edge line of the identification point of the scanning rod in the image information is determined, and the image clarity of the image information is determined based on the smoothness; and
  S230: image quality information of the scanning rod is determined based on the image clarity.

In some embodiments of the present disclosure, image quality information of the scanning rod can be determined by analyzing specific parameters in image information. In a specific implementation scene, the background region of the scanning rod may be a black region, and the corresponding identification point of the scanning rod may be a white dot. It should be understood that the color of the identification point or background region is not specifically limited in examples of the present disclosure. The color of the identification point or background region may be determined according to the model, color or actual use requirements of the scanning rod as long as the identification point and the background region can be distinguished significantly.

It is easy to understand that in the embodiments of the present disclosure, a weighted average gray value corresponding to the centre of the identification point can be computed, and the weighted average gray value corresponding to the centre of the identification point is used as a gray value of the identification point; a weighted average gray value corresponding to the edge portion in contact with the edge line in the background region is computed, and the weighted average gray value corresponding to the edge portion is used as a gray value of the background region; and then, a gray value contrast between the identification point and the background region of the scanning rod is computed according to the gray value of the identification point and the gray value of the background region.

As an example and not a limitation, in some embodiments of the present disclosure, the gray value contrast between the identification point and the background region of the scanning rod in the image information is specifically determined by measuring the gray value difference between the identification point and the background in the image. It should be understood that the higher the gray value contrast between the identification point and the background region, the more distinct the distinction between the identification point and the background region, which usually means that the higher the image clarity of the image information, the better the image quality of the image information.

It should still be understood that the smoothness of the edge line is another important index of image clarity, where the smoother the edge line of the identification point of the scanning rod, the higher the image clarity of the image information, and the better the image quality of the image information.

In some embodiments of the present disclosure, by evaluating the smoothness of the edge line of the identification point, based on the smoothness, the image clarity of the image information can be determined. Finally, the scanning rod management system will determine the overall image quality of the scanning rod according to the image clarity information obtained in the above step.

Through the above method example, it is possible to effectively evaluate and ensure the image quality of the scanning rod scanned by the scan body in an oral scanning process, thereby improving the accuracy and reliability of oral scanning data.

Figure 3:
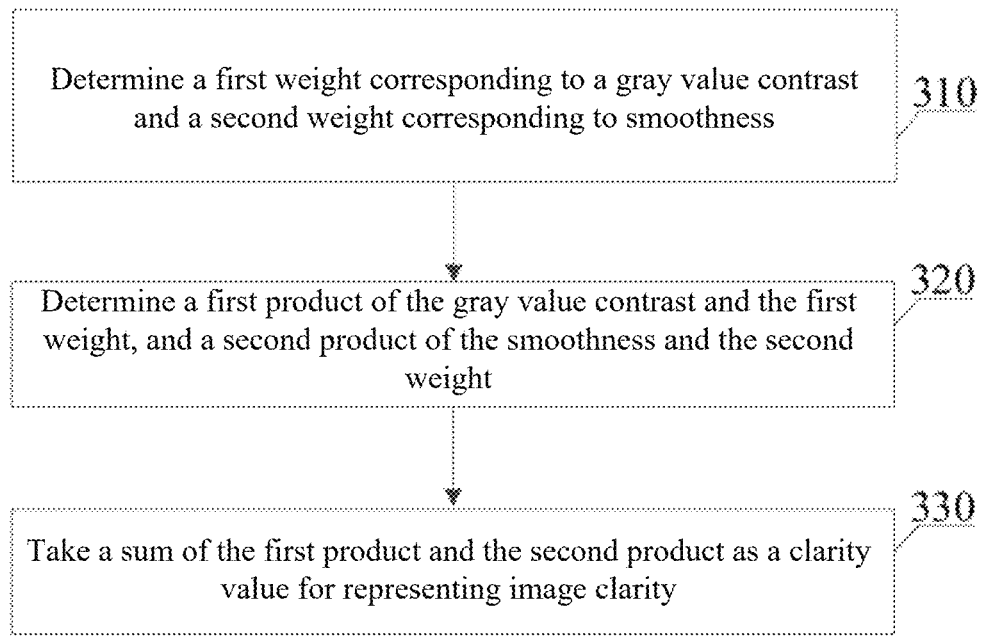
FIG. 3 is a schematic flow chart of an alternative method for monitoring a scanning rod status provided in some embodiments of the present disclosure.

Referring to FIG. 3, FIG. 3 shows a schematic flow chart of a method for monitoring a scanning rod status provided in the present disclosure. In some embodiments of the present disclosure, the process of determining image clarity of the image information based on the gray value contrast and the smoothness includes:

S310: a first weight corresponding to the gray value contrast and a second weight corresponding to the smoothness are determined;

S320: a first product of the gray value contrast and the first weight, and a second product of the smoothness and the second weight are determined; and S330: a sum of the first product and the second product is taken as a clarity value for representing the image clarity.

In some embodiments of the present disclosure, a further detailed description is given on how to determine the image clarity of the image information through weighted computation. In some embodiments of the present disclosure, a first weight may be assigned to the above gray value contrast to reflect the contribution degree or importance of the gray value contrast in image clarity evaluation; and a second weight may be assigned to the above smoothness to reflect the contribution degree or importance of the smoothness in overall image clarity evaluation.

The scanning rod management system computes a product of the gray value contrast and the corresponding first weight to obtain a first product for representing the weighted contribution of the gray value contrast for determining the image clarity. Similarly, the system computes a product of the smoothness and the corresponding second weight to obtain a second product for representing the weighted contribution of the smoothness for determining the image clarity. Finally, the first product and the second product are added to obtain a comprehensive value for representing the image clarity.

In some embodiments of the present disclosure, the above computation process can be represented by the following mathematical formula:

$$\text{clarity value} = (\text{gray value contrast} \times \text{first weight}) + (\text{smoothness} \times \text{second weight}).$$

Through the above method example, the clarity of the image of the scanning rod can be more accurately evaluated, thereby more effectively determining the image quality information of the scanning rod.

Figure 4:
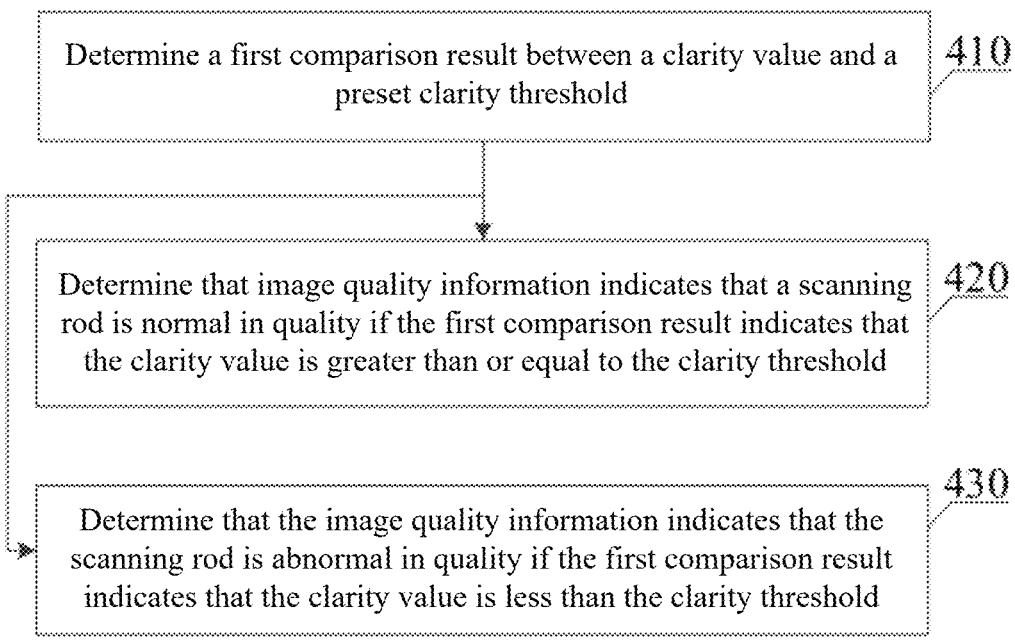
FIG. 4 is a schematic flow chart of an alternative method for monitoring a scanning rod status provided in some embodiments of the present disclosure.

Referring to FIG. 4, FIG. 4 shows a schematic flow chart of a method for monitoring a scanning rod status provided in the present disclosure. In some embodiments of the present disclosure, the process of determining image quality information of the scanning rod based on image clarity includes:

S410: a first comparison result between the clarity value and a preset clarity threshold is determined;

S420: it is determined that the image quality information indicates that the scanning rod is normal in quality if the first comparison result indicates that the clarity value is greater than or equal to the clarity threshold; and S430: it is determined that the image quality information indicates that the scanning rod is abnormal in quality if the first comparison result indicates that the clarity value is less than the clarity threshold.

A method for determining image quality information of a scanning rod is further explained below. A method based on comparison of an image clarity value and a preset clarity threshold is described in detail, which is used for determining image quality information of a scanning rod.

In some embodiments of the present disclosure, the computed clarity value is compared with a preset clarity threshold to obtain a first comparison result between the clarity value and the clarity threshold. It should be understood that in some embodiments of the present disclosure, the clarity threshold can be set based on, but not limited to, the design standards and expected performance of the scanning rod, and can be understood as a minimum clarity threshold. The value range of the clarity threshold is not specifically limited or constrained in the embodiments of the present disclosure.

If the first comparison result indicates that the clarity value is greater than or equal to the clarity threshold, it is determined that the image quality information indicates that the scanning rod is normal in quality, so no further maintenance or adjustment of the scanning rod is required. If the first comparison result indicates that the clarity value is less than the clarity threshold, it is determined that the image quality information indicates that the scanning rod is abnormal in quality, so maintenance or adjustment of the scanning rod may be required.

Through the above example, the image quality of the scanning rod can be automatically monitored, a simple and intuitive judgment standard is provided for evaluating the use status of the scanning rod, and measures can be taken in time when quality problems are monitored to ensure that the scanning rod always maintains the optimal performance, thereby being favorable for reducing clinical errors caused by device faults.

Figure 5:
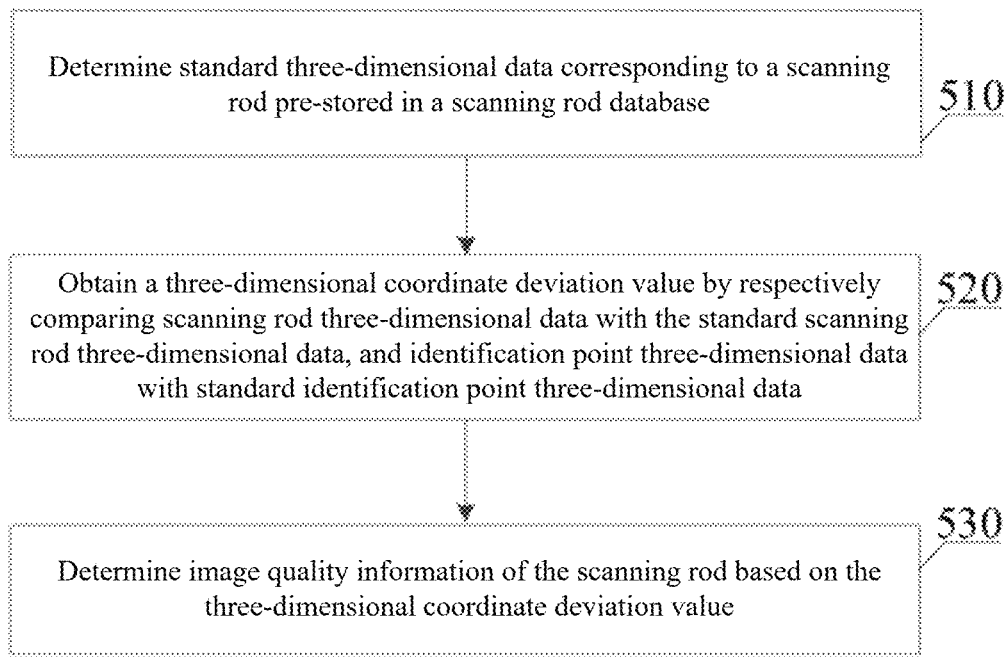
FIG. 5 is a schematic flow chart of an alternative method for monitoring a scanning rod status provided in another embodiment of the present disclosure.

Referring to FIG. 5, FIG. 5 shows a schematic flow chart of a method for monitoring a scanning rod status provided in the present disclosure. An alternative implementation also exists. The process of determining image quality information of the scanning rod based on the scanning rod three-dimensional data and the identification point three-dimensional data further includes:

S510: standard three-dimensional data corresponding to the scanning rod pre-stored in a scanning rod database is determined, where the above standard three-dimensional data includes: standard scanning rod three-dimensional data for representing a surface profile of the scanning rod, and standard identification point three-dimensional data for representing an identification point of the scanning rod;

S520: a three-dimensional coordinate deviation value is obtained by respectively comparing the scanning rod three-dimensional data with the standard scanning rod three-dimensional data, and the identification point three-dimensional data with the standard identification point three-dimensional data; and S530: image quality information of the scanning rod is determined based on the three-dimensional coordinate deviation value.

In some embodiments of the present disclosure, embodiments of the present disclosure also describe a method for determining image quality of a scanning rod by comparing actual scanning data with standard data pre-stored in a database in detail.

First, by accessing the scanning rod database, the standard three-dimensional data (standard three-dimensional model) corresponding to the scanning rod pre-stored in the scanning rod database is determined. The standard three-dimensional data is used for representing the expected, ideal or standard status of the scanning rod. For example, the above standard three-dimensional data is three-dimensional data corresponding the scanning rod in a factory status when the scanning rod is not used and not worn. The standard three-dimensional data specifically includes: standard scanning rod three-dimensional data for representing a surface profile of the scanning rod, and standard identification point three-dimensional data for representing an identification point of the scanning rod.

Second, the scanning rod management system compares the three-dimensional data obtained by actual scanning with the standard data in the database, and respectively compares the scanning rod three-dimensional data with the standard scanning rod three-dimensional data, and the identification point three-dimensional data with the standard identification point three-dimensional data, so as to determine the difference between the actually scanned data and the standard three-dimensional data, and the difference is quantified to obtain a three-dimensional coordinate deviation value.

Then, image quality information of the scanning rod is determined based on the three-dimensional coordinate deviation value. Finally, the scanning rod management system evaluates the image quality of the scanning rod based on the three-dimensional coordinate deviation value. Specifically, if the three-dimensional coordinate deviation value is within an acceptable range, it can be considered that the image quality of the scanning rod is normal; and if the deviation value exceeds the predetermined range, it is considered that the image quality of the scanning rod may be abnormal.

Through the above example, it can be ensured that the scanning rod always maintains the optimal performance in precision applications such as dental implant scanning, and it is also favorable for reducing clinical errors caused by device faults and improving the safety and effect of treatment on patients.

In some embodiments of the present disclosure, a deviation value threshold can be set in advance according to the design standards and expected performance of the scanning rod, and a second comparison result between the three-dimensional coordinate deviation value and the preset deviation value threshold can be determined by comparing the actually measured three-dimensional coordinate deviation value with the preset deviation value threshold.

If the second comparison result indicates that the three-dimensional coordinate deviation value is greater than or equal to the deviation value threshold, that is, the three-dimensional coordinate deviation value reaches or exceeds the preset deviation value threshold, it indicates that there may be a problem with the image quality of the scanning rod, and therefore, the scanning rod management system will mark the scanning rod as being abnormal in quality. If the second comparison result indicates that the three-dimensional coordinate deviation value is less than the deviation value threshold, that is, the three-dimensional coordinate deviation value is lower than the preset deviation value threshold, it indicates that the image quality of the scanning rod is normal, and therefore, no further maintenance or adjustment is required.

Through the above method example, the image quality of the scanning rod can be automatically monitored, and measures can be taken in time when quality problems are monitored, thereby being favorable for reducing clinical errors caused by device faults and improving the safety and effect of treatment on patients.

The use of damaged or degraded medical instruments cannot ensure the effect and safety of medical operations, and therefore, embodiments of the present disclosure provide a solution for determining status information of a scanning rod based on use frequency of the scanning rod. In some embodiments of the present disclosure, the method further includes:

a use record of the scanning rod is acquired, where the use record is inputted by a user through an input device, acquired before the scanning rod is scanned and/or in a process of scanning the scanning rod;

the use frequency of the scanning rod is acquired based on the use record; and status information of the scanning rod is determined based on the use frequency of the scanning rod.

In some embodiments of the present disclosure, when a user (such as dentist or technician) operates a scanning rod, for example, when a dentist or technician uses a scan body to scan a scanning rod placed in the oral cavity, the scanning rod management system can generate a corresponding use record of the scanning rod according to the operation behavior of the user, or obtain a use record of the scanning rod before the scanning rod is scanned and in a process of scanning the scanning rod. It should be understood that the use record includes detailed information such as use time, sterilization time, and sterilization frequency of the scanning rod. By counting the use record of the scanning rod, the scanning rod management system can accurately compute the use frequency of the scanning rod, thereby providing a basis for updating and managing the status of the scanning rod subsequently.

In some embodiments of the present disclosure, assuming that an oral hospital introduces an intelligent scanning rod management system and the intelligent scanning rod management system is applied to scanning and management processes of oral scanning rods, when a dentist uses a scan body to scan a scanning rod placed in the oral cavity of a patient, the scanning rod management system associated with the scanning rod will record information such as time of each scanning, a scanned region, sterilization time, and sterilization frequency, and generate a scanning record. Then, the scanning rod management system intelligently counts the use frequency of each scanning rod according to the scanning record.

Finally, the scanning rod management system evaluates and determines the status information of the scanning rod based on the use frequency of the scanning rod. When the use frequency of a scanning rod reaches a preset use frequency threshold, it is predicted that the quality of the scanning rod is abnormal.

Through the above method example, it can be ensured that the use information of the scanning rod is accurately recorded and updated in time, and the scanning rod is always in good working status, thereby providing reliable data support for effective management of scanning rods.

In some embodiments of the present disclosure, the process of determining the status information of the scanning rod based on the use frequency of the scanning rod includes: a first comparison result between the use frequency and a preset use frequency threshold is determined;
  it is determined that the status of the scanning rod is normal in quality if the first comparison result indicates that the use frequency is less than the preset use frequency threshold; and
  it is determined that the status of the scanning rod is abnormal in quality if the first comparison result indicates that the use frequency is greater than or equal to the preset use frequency threshold.

In some embodiments of the present disclosure, the scanning rod management system can judge whether the cumulative use frequency of the scanning rod already exceeds the preset use frequency threshold regularly or after the scanning rod is scanned every time. Specifically, the use frequency threshold is preset according to the design life and quality standards of the scanning rod, and the use frequency threshold of the scanning rod can be changed and set according to the model of the scanning rod in conjunction with actual situations or application requirements. For example, the use frequency threshold may be set as 100 or 200. It should be understood that the specific value range of the use frequency threshold is not specifically limited in the present application.

If the scanning rod management system judges that the use frequency of the scanning rod is less than the use frequency threshold, the status of the scanning rod is normal in quality, which means that the scanning rod can be used continuously and maintenance is not required. If the scanning rod management system judges that the use frequency of the scanning rod is already greater than the use frequency threshold, it is determined that the end of service life of the scanning rod is reached, and it is predicted that maintenance or replacement may be required, so that this information can be automatically fed back to the user, for example, in the form of interface information prompts or sound prompts, or notified to the user through email or applications.

For example, in an example, when the use frequency of a scanning rod reaches the preset use frequency threshold, the scanning rod management system may output prompt information or warning information on a display interface. For example, if the use frequency threshold of the scanning rod is 100, when the use frequency of a scanning rod exceeds 100, the use frequency of the scanning rod can be displayed in other colors on the display interface to remind the user that maintenance of the scanning rod or replacement of a new scanning rod may be required.

Through the above method example, the user can know the use situation of the scanning rod in time. If the use frequency is excessive, it means that the end of service life of the scanning rod is reached, and the accuracy of the scanning rod may no longer meet the requirements, that is, the quality is abnormal, so that a new scanning rod needs to be replaced to ensure the accuracy and safety of medical operations.

In some embodiments of the present disclosure, the process of acquiring scanning information of the scanning rod further includes:
  the scanning rod is regularly monitored according to a preset self-check period through a scanning apparatus in response to a first instruction to obtain self-check scanning information, and status information of the scanning rod is updated and acquired based on the self-check scanning information of the scanning rod to determine the status of the scanning rod, where the first instruction is used for indicating the scanning apparatus to monitor the status of the scanning rod based on a regular self-check mode.

In some embodiments of the present disclosure, the scan body will start a self-check program after receiving a specific first instruction. The first instruction is an automated command for triggering the regular self-check of the scanning rod. Specifically, the first instruction is used for indicating the scan body to monitor the status of the scanning rod based on the regular self-check mode.

For example, in some embodiments of the present disclosure, a self-check instruction set may be stored in the scanning rod management system to control the scan body to operate in a predetermined self-check mode, thereby regularly monitoring the status and performance of the scanning rod.

In a regular self-check solution, the scan body will regularly monitor the surface status and actual use situation of the scanning rod according to a preset time interval (self-check period) to ensure that the scanning rod is always in an optimal working status. After the self-check process is completed, the scanning rod management system correspondingly generates self-check scanning information, and records the date and self-check scanning information during self-check. The self-check scanning information may include: performance data of the scanning rod, image quality data, or the like.

Moreover, after the self-check process is completed, the scanning rod management system will analyze the performance data of the scanning rod and monitor any alternative signs of performance degradation or faults of the scanning rod based on the self-check scanning information of the scanning rod, so as to update the status information of the scanning rod, thereby determining whether current status of the scanning rod is normal in operation or requires maintenance. By regular self-check of the scanning rod, the maintenance efficiency of the scanning rod can be improved.

In some embodiments of the present disclosure, embodiments of the present disclosure further provide a method for updating and determining the status of a scanning rod through a regular polling process. The process of acquiring scanning information of the scanning rod further includes:

the scanning rod is regularly monitored according to a preset polling period through a scanning apparatus in response to a second instruction to obtain polling scanning information, where the second instruction is used for indicating the scanning apparatus to scan the scanning rod based on a regular polling mode, monitoring items of the regular polling mode are more than monitoring items corresponding to the regular self-check mode, and a monitoring period corresponding to the preset polling period is different from a monitoring period corresponding to the preset self-check period.

In some embodiments of the present disclosure, the scanning apparatus will start a self-check program after receiving a specific second instruction. The second instruction may also be an automated command for triggering the regular polling of the scanning rod. Specifically, the second instruction is used for indicating the scanning apparatus to monitor the status of the scanning rod based on the regular polling mode.

For example, in some embodiments of the present disclosure, a polling instruction set may be stored in the scanning rod management system to control the scanning apparatus to operate in a predetermined polling mode, thereby maintaining the performance and reliability of the scanning rod.

In a regular polling solution, the scanning apparatus regularly monitors the surface status and actual use situation of the scanning rod according to a preset time interval (polling period) to ensure that the scanning rod maintains the optimal working status within a wider range of performance parameters. It should be understood that the duration of the polling period is different from that of the self-check period. For example, the duration of the polling period may be longer than that of the self-check period. Of course, it should still be understood that the duration of the self-check period may also be longer than that of the polling period. Monitoring items of the regular polling mode are more than monitoring items corresponding to the regular self-check mode, that is, the regular polling mode covers more monitoring items than the regular self-check mode. The scanning rod can be scanned in the regular polling mode to comprehensively evaluate the status of the scanning rod. After the polling process is completed, the scanning rod management system will generate polling scanning information. The polling scanning information may include: more comprehensive performance data of the scanning rod, image quality data, or the like.

Moreover, after the polling process is completed, the scanning rod management system will analyze the performance data of the scanning rod and monitor any alternative signs of performance degradation or faults of the scanning rod based on the polling scanning information of the scanning rod, so as to update the status information of the scanning rod, thereby determining whether current status of the scanning rod is normal in operation or requires maintenance. In addition, in an example, the scanning rod management system automatically records the polling scanning information and generates maintenance logs. Through the above method example, the efficiency of maintaining the scanning rod can be improved. Moreover, in some embodiments of the present disclosure, by combining regular polling with regular self-check, it can be ensured that the performance of the scanning rod is monitored and maintained at different levels.

In some embodiments of the present disclosure, the scanning rod management system will comprehensively compare the differences between the use frequency of the scanning rod, the matching accuracy of three-dimensional data, the clarity of the surface image of the scanning rod collected by a camera, or the like and a standard value (or preset threshold). In a case that the status of the scanning rod is determined to be abnormal in quality, for example, if it is determined that the status of the scanning rod does not reach the preset performance, end of service life, or quality standards, the status of the scanning rod is determined to be abnormal in quality, and then, warning information is sent to the user by visual signals, audio signals, text messages, or any other form of notification, to remind the user to perform necessary maintenance operations. Through the above method example, the status of the scanning rod can be monitored in time, and the user can be quickly notified in case of any problems that may affect the scanning quality.

In some embodiments of the present disclosure, the method for monitoring a scanning rod status further includes:

a wear maintenance process is set based on the scanning rod, where the wear maintenance process is used for maintaining expected wear or faults of the scanning rod under preset conditions, and the maintenance includes at least one of the following: device detection, repair, replacement of parts, and replacement of the scanning rod; and the wear maintenance process is triggered and started in a case that it is determined that the status of the scanning rod is abnormal in quality.

In some embodiments of the present disclosure, embodiments of the present disclosure further provide a wear maintenance process which is started when the status of a scanning rod is determined to be abnormal in quality. First, embodiments of the present disclosure can establish a wear maintenance process based on the scanning rod to manage the expected wear or faults of the scanning rod under normal use conditions. Exemplarily, the wear maintenance process includes a series of maintenance activities, such as device detection, repair, and replacement of parts or the whole scanning rod, to avoid sudden shutdown of the scanning rod during working and ensure normal operation and performance of the device.

In some embodiments of the present disclosure, the above maintenance activities can be selected according to the specific situation and wear degree of the scanning rod. Specifically, the device detection refers to comprehensive check of the scanning rod to determine the performance and functions of the scanning rod. The repair refers to repair of the discovered quality or wear problems of the scanning rod to restore the normal working status of the scanning rod. The replacement of parts refers to replacement of new parts if some parts of the scanning rod are damaged or worn and reach or approach the end of the service life. The replacement of a scanning rod refers to replacement of a new scanning rod if the scanning rod is seriously damaged. The wear maintenance process is triggered and started in a case that it is determined that the status of the scanning rod is abnormal in quality. When the system monitors that the status of the scanning rod does not meet the preset quality standards, the maintenance process will be automatically started to perform necessary maintenance or replacement of the scanning rod in time.

By using the method in the example of the present disclosure for monitoring the status of the scanning rod, in case of any problems that may affect the scanning quality, the scanning rod can be quickly maintained, and the device performance of the scanning rod can be maintained to ensure the treatment quality.

It should be understood that sequence numbers of the steps of the above embodiments do not indicate an execution sequence, and an execution sequence of processes shall be determined based on functions and internal logic thereof, and shall constitute no limitation on an implementation process of the embodiments of the present disclosure.

Figure 6:
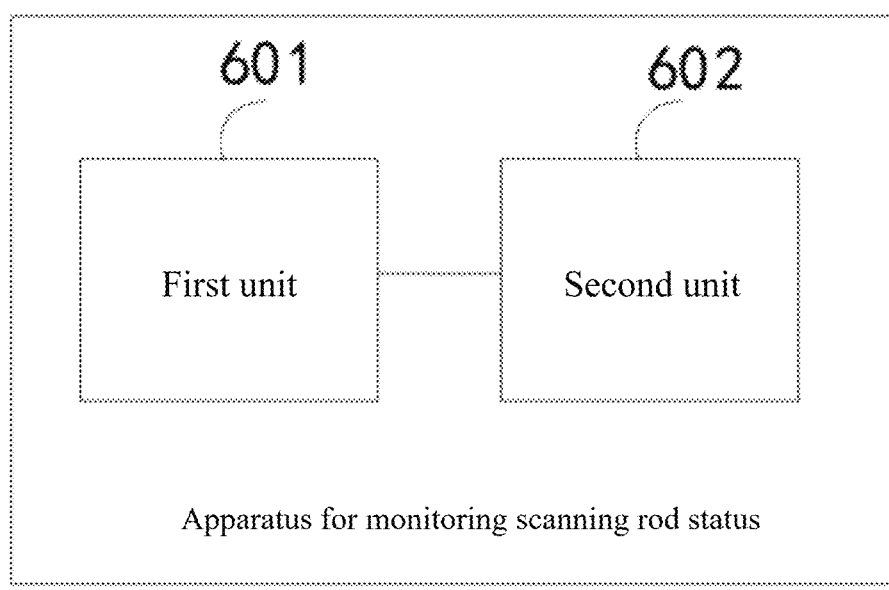
FIG. 6 is a schematic structural diagram of an apparatus for monitoring a scanning rod status provided in some embodiments of the present disclosure.

Corresponding to the method for monitoring a scanning rod status in the above embodiments, FIG. 6 is a schematic structural diagram of an apparatus for monitoring a scanning rod status provided in some embodiments of the present disclosure. The apparatus may be implemented as part or all of a computer device through software, hardware, or a combination of software and hardware. The computer device may be an electronic device shown in FIG. 7.

Referring to FIG. 6, the apparatus for monitoring a scanning rod status includes:
- a first unit 601, configured to acquire scanning information of the scanning rod; and
- a second unit 602, configured to update and acquire status information of the scanning rod based on the scanning information of the scanning rod to determine status of the scanning rod.

Alternatively, based on any one of the above embodiments, as an example of the present disclosure, the above first unit includes: a first sub-unit, configured to scan the scanning rod through a scanning apparatus in response to a scanning start instruction to acquire image information of the scanning rod.

Alternatively, based on any one of the above embodiments, as an example of the present disclosure, the status information includes: image quality information, and the second unit includes: a second sub-unit, configured to acquire the image quality information of the scanning rod based on the image information of the scanning rod.

Alternatively, based on any one of the above embodiments, as an example of the present disclosure, the status information further includes: image quality warning information; and the apparatus further includes:
- a third unit, configured to send the image quality warning information to a user if the image quality information indicates that the status of the scanning rod is abnormal in quality in a process of scanning the scanning rod; and
- a fourth unit, configured to display the image quality information and the image quality warning information after the scanning is completed.

Alternatively, based on any one of the above embodiments, as an example of the present disclosure, the above second sub-unit is also specifically configured to:
- determine image quality information of the scanning rod based on image clarity of the image information;
- perform reconstruction based on the above image information to obtain scanning rod three-dimensional data of the above scanning rod; and determine image quality information of the above scanning rod based on the above scanning rod three-dimensional data; and/or,
- perform reconstruction based on the above image information to obtain identification point three-dimensional data of the above scanning rod; and determine image quality information of the above scanning rod based on the above identification point three-dimensional data.

Alternatively, based on any one of the above embodiments, as an example of the present disclosure, the above second sub-unit is also specifically configured to:
- determine a gray value contrast between an identification point and a background region of the above scanning rod in the above image information, and determine image clarity of the above image information based on the above gray value contrast; and/or,
- determine smoothness of an edge line of the identification point of the above scanning rod in the above image information, and determine image clarity of the above image information based on the above smoothness; and
- determine image quality information of the above scanning rod based on the above image clarity.

Alternatively, based on any one of the above embodiments, as an example of the present disclosure, the above second sub-unit is also specifically configured to:
- determine a first weight corresponding to the gray value contrast and a second weight corresponding to the smoothness; determine a first product of the gray value contrast and the first weight, and a second product of the smoothness and the second weight; and take a sum of the first product and the second product as a clarity value for representing the image clarity.

Alternatively, based on any one of the above embodiments, as an example of the present disclosure, the above second sub-unit is also specifically configured to:
- determine a first comparison result between the clarity value and a preset clarity threshold; determine that the image quality information indicates that the scanning rod is normal in quality if the first comparison result indicates that the clarity value is greater than or equal to the clarity threshold; and determine that the image quality information indicates that the scanning rod is abnormal in quality if the first comparison result indicates that the clarity value is less than the clarity threshold.

Alternatively, based on any one of the above embodiments, as an example of the present disclosure, the above second sub-unit is also specifically configured to:
- determine standard three-dimensional data corresponding to the scanning rod pre-stored in a scanning rod database, where the standard three-dimensional data includes: standard scanning rod three-dimensional data for representing a surface profile of the scanning rod, and standard identification point three-dimensional data for representing an identification point of the scanning rod; respectively compare the scanning rod three-dimensional data with the standard scanning rod three-dimensional data, and the identification point three-dimensional data with the standard identification point three-dimensional data to obtain a three-dimensional coordinate deviation value; and determine image quality information of the scanning rod based on the three-dimensional coordinate deviation value.

Alternatively, based on any one of the above embodiments, as an example of the present disclosure, the above second sub-unit is also specifically configured to:

determine a second comparison result between the three-dimensional coordinate deviation value and a preset deviation value threshold; determine that the image quality information indicates that the scanning rod is abnormal in quality if the second comparison result indicates that the three-dimensional coordinate deviation value is greater than or equal to the deviation value threshold; and determine that the image quality information indicates that the scanning rod is normal in quality if the second comparison result indicates that the three-dimensional coordinate deviation value is less than the deviation value threshold.

Alternatively, based on any one of the above embodiments, as an example of the present disclosure, the apparatus further includes:

a fifth unit, configured to acquire a use record of the scanning rod, where the use record is inputted by a user through an input device, acquired before the scanning rod is scanned and/or in a process of scanning the scanning rod;

a sixth unit, configured to acquire use frequency of the scanning rod based on the use record; and a seventh unit, configured to determine status information of the scanning rod based on the use frequency of the scanning rod.

Alternatively, based on any one of the above embodiments, as an example of the present disclosure, the above seventh unit is also specifically configured to:

determine a first comparison result between the use frequency and a preset use frequency threshold; determine that the status of the scanning rod is normal in quality if the first comparison result indicates that the use frequency is less than the preset use frequency threshold; and determine that the status of the scanning rod is abnormal in quality if the first comparison result indicates that the use frequency is greater than or equal to the preset use frequency threshold.

Alternatively, based on any one of the above embodiments, as an example of the present disclosure, the first unit further includes:

a third sub-unit, configured to regularly monitor the scanning rod according to a preset self-check period through a scanning apparatus in response to a first instruction to obtain self-check scanning information, and update and acquire status information of the scanning rod based on the self-check scanning information of the scanning rod to determine the status of the scanning rod, where the first instruction is used for indicating the scanning apparatus to monitor the status of the scanning rod based on a regular self-check mode.

Alternatively, based on any one of the above embodiments, as an example of the present disclosure, the first unit further includes:

a fourth sub-unit, configured to regularly monitor the scanning rod according to a preset polling period through a scanning apparatus in response to a second instruction to obtain polling scanning information, where the second instruction is used for indicating the scanning apparatus to scan the scanning rod based on a regular polling mode, monitoring items of the regular polling mode are more than monitoring items corresponding to the regular self-check mode, and a monitoring period corresponding to the preset polling period is different from a monitoring period corresponding to the preset self-check period.

Alternatively, based on any one of the above embodiments, as an example of the present disclosure, the apparatus further includes:

an eighth unit, configured to send warning information to a user in a case that it is determined that the status of the scanning rod is abnormal in quality, where the abnormal in quality is used for representing that current status of the scanning rod does not reach a preset status standard.

Alternatively, based on any one of the above embodiments, as an example of the present disclosure, the apparatus further includes:

a ninth unit, configured to set a wear maintenance process based on the scanning rod, where the wear maintenance process is used for maintaining expected wear or faults of the scanning rod under preset conditions, and the maintenance includes at least one of the following: device detection, repair, replacement of parts, and replacement of the scanning rod; and a tenth unit, configured to trigger and start the wear maintenance process in a case that it is determined that the status of the scanning rod is abnormal in quality.

Alternatively, based on any one of the above embodiments, as an example of the present disclosure, the apparatus further includes:

a tenth unit, configured to display the status information through a client of a user in response to a status information display instruction of the user.

It should be noted that when the apparatus for monitoring a scanning rod status provided in the above embodiment monitors the status of the scanning rod, only the division of the above functional modules is used as an example for illustration. In practical applications, the above function allocation may be completed by different functional modules according to needs, that is, the internal structure of the apparatus is divided into different functional modules to complete all or part of the functions described above.

The functional units and modules in the above embodiments may be all integrated into one processing unit, may also physically exist separately, or may be integrated into one unit by two or more units. The above integrated unit may be implemented in the form of hardware or in the form of software functional units. In addition, the specific names of the functional units and modules are only for the convenience of distinguishing each other, and are not intended to limit the scope of protection of the embodiments of the present disclosure.

It should be noted that the content of information interaction, the execution process, or the like between the apparatuses/units is based on the same concept as this method embodiment of the present disclosure, and for specific functions and brought technical effects, reference may be made to the part of the method embodiment for details, which will not be repeated herein.

Embodiments of the present disclosure further provide an electronic device. The electronic device includes one or more processors and a memory. The memory is coupled to the one or more processors. The memory is configured to store a computer program code. The computer program code includes a computer instruction. The one or more processors can call the computer instruction to enable the electronic device to execute the method for monitoring a scanning rod status as described above.

The electronic device may be a mobile phone, a smart screen, a tablet computer, a wearable electronic device, a vehicle-mounted electronic device, an augmented reality (AR) device, a virtual reality (VR) device, a laptop computer, an ultra-mobile personal computer (UMPC), a netbook, a personal digital assistant (PDA), a projector, a communication device such as a server, a memory or a base station, an intelligent vehicle, or the like. The embodiments of the present disclosure do not impose any restrictions on the specific type of the electronic device.

Embodiments of the present disclosure further provide a computer-readable storage medium. The computer-readable storage medium stores a computer instruction. The computer-readable storage medium, when run on an electronic device, causes the electronic device to execute the method for monitoring a scanning rod status as described above.

The computer instruction may be stored in a computer-readable storage medium, or transmitted from one computer-readable storage medium to another computer-readable storage medium. For example, the computer instruction may be transmitted from one website, computer, server or data centre via wired (such as coaxial cable, optical fiber and digital subscriber line (DSL)) or wireless (such as infrared, wireless and microwave) ways to another website, computer, server or data centre. The computer-readable storage medium may be any available medium that the computer can access, or a data storage device such as a server or a data centre that integrates one or more available media. The available medium may be a magnetic medium (for example, a floppy disk, a hard disk, or a magnetic tape), an optical medium, a semiconductor medium (for example, a solid state disk (SSD)), or the like.

Embodiments of the present disclosure further provide a computer program product including a computer instruction. The computer program product, when run on an electronic device, causes the electronic device to execute the method for monitoring a scanning rod status as described above.

The computer storage medium and computer program product provided in the above embodiments of the present disclosure are all configured to execute the methods provided above. Therefore, the beneficial effects that can be achieved can refer to the corresponding beneficial effects of the methods provided above, which will not be repeated here.

In the above embodiment, it can be fully or partially implemented through software, hardware, firmware, or any combination thereof. When implemented using software, it can be fully or partially implemented in the form of a computer program product. The computer program product includes one or more computer instructions. When the computer instruction is loaded and executed on the computer, all or part of the processes or functions described in the embodiments of the present disclosure are generated. The computer may be a general-purpose computer, a special-purpose computer, a computer network, or other programmable devices. The computer instruction may be stored in a computer-readable storage medium, or transmitted from one computer-readable storage medium to another computer-readable storage medium. For example, the computer instruction may be transmitted from one website, computer, server or data centre via wired (such as coaxial cable, optical fiber and digital subscriber line (DSL)) or wireless (such as infrared, wireless and microwave) ways to another website, computer, server or data centre. The computer-readable storage medium may be any available medium that the computer can access, or a data storage device such as a server or a data centre that integrates one or more available media. The available medium may be a magnetic medium (for example, a floppy disk, a hard disk, or a magnetic tape), an optical medium (for example, a digital versatile disc (DVD), a semiconductor medium (for example, a solid state disk (SSD), or the like.

FIG. 7 is a schematic structural diagram of an electronic device provided in some embodiments of the present disclosure. The device may be a mobile phone, a computer, a digital broadcast terminal, a messaging device, a gaming console, a tablet, a medical device, exercise equipment, a personal digital assistant, or the like.

The device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 for executing instructions to complete all or part of the steps in the described methods. Moreover, the processing component 702 may include one or more modules which facilitate the interaction between the processing component 702 and other components. For example, the processing component 702 may include a multimedia module to facilitate the interaction between the multimedia component 708 and the processing component 702.

The memory 704 is configured to store various types of data to support operations on the device 700. Examples of such data include instructions for any applications or methods operated on the device 700, contact data, phonebook data, messages, pictures, videos, or the like. The memory 704 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and a user. In some embodiments, the screen may include a liquid crystal display (LCD) and a touch panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. The touch sensors may not only sense a boundary of a touch or swipe action, but also sense a period of time and a pressure associated with the touch or swipe action. In some embodiments, the multimedia component 708 includes a front camera and/or a rear camera. The front camera and/or the rear camera may receive external multimedia data when the device 700 is in an operation mode, such as a photographing mode or a video mode. Each of the front camera and the rear camera may be a fixed optical lens system or may have a focal length and optical zoom capability.

The audio component 710 is configured to output and/or input audio signals. For example, the audio component 710 includes a microphone (MIC) configured to receive external audio signals when the device 700 is in an operation mode, such as a call mode, a recording mode, or a voice recognition mode. The received audio signal may be further stored in the memory 704 or sent via the communication component 716. In some embodiments, the audio component 710 further includes a speaker for outputting audio signals.

The I/O interface 712 provides an interface between the processing component 702 and a peripheral interface module, where the peripheral interface module may be a keyboard, a click wheel, buttons, or the like. The buttons may include, but are not limited to, a home button, a volume button, a start button, and a lock button.

The sensor component 714 includes one or more sensors to provide status assessments of various aspects of the device 700. For example, the sensor component 714 may detect an opened/closed status of the device 700 and the relative positioning of components such as a display and a keypad of the device 700, and the sensor component 714 may also detect the position change of the device 700 or a component of the device 700, the presence or absence of contact between a user and the device 700, the orientation or acceleration/deceleration of the device 700, and the temperature change of the device 700. The sensor component 714 may include a proximity sensor configured to detect presence of an object nearby without any physical contact. The sensor component 714 may also include a light sensor, such as a complementary metal oxide semiconductor (CMOS) or charge coupled device (CCD) image sensor, for use in imaging applications. In some embodiments, the sensor component 714 may also include an acceleration sensor, a gyroscope sensor, a magnetic sensor, a pressure sensor, or a temperature sensor.

The communication component 716 is configured to facilitate wired or wireless communications between the device 700 and other devices. The device 700 may access a wireless network based on a communication standard, such as WiFi, 2G or 3G, or a combination thereof. In an exemplary embodiment, the communication component 716 receives a broadcast signal or broadcast associated information from an external broadcast management system via a broadcast channel. In an exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, micro-processors, or other electronic components, for executing the above method.

In an exemplary embodiment, there is also provided a non-transitory computer-readable storage medium including instructions, such as a memory 704 including instructions executable by the processor 720 of the device 700, for executing the above method. For example, the non-transitory computer-readable storage medium may be an ROM, a random access memory (RAM), a compact disc read-only memory (CD-ROM), a magnetic tape, a floppy disk, an optical data storage device, or the like.

In the above embodiments, the descriptions of the embodiments have respective focuses. For a part that is not described in detail or recorded in an embodiment, reference may be made to related descriptions in other embodiments.

A person of ordinary skill in the art may notice that the exemplary units and algorithm steps described with reference to the embodiments disclosed in the present specification may be implemented in electronic hardware, or a combination of computer software and electronic hardware. Whether the functions are executed in hardware or software depends on particular applications and design constraint conditions of the technical solutions. A person skilled in the art may implement the described functions by different methods for each particular application, but such implementation is not to be considered beyond the scope of the present disclosure.

In the embodiments provided in the present application, it should be understood that the disclosed apparatus/network device and method may be implemented in other manners. For example, the described apparatus/network device embodiment is merely an example. For example, the module or unit division is merely logical function division and may be other division during actual implementation. For example, multiple units or components may be combined or integrated into another system, or some features may be ignored or not performed. In addition, the displayed or discussed mutual coupling or direct coupling or communication connection may be implemented by some interfaces. The indirect coupling or communication connection between the apparatuses or units may be implemented in electrical, mechanical, or other forms.

The units described as separate components may or may not be physically separated, and the components displayed as units may or may not be physical units, that is, may be located in one place or may be distributed over a plurality of network units. Some or all of the units may be selected according to actual needs to achieve the objectives of the solutions of the embodiments.

The embodiments described above are only used to explain the technical solutions of the present disclosure, and are not limited thereto. Although the present disclosure has been described in detail with reference to the above embodiments, those of ordinary skill in the art should understand that the technical solutions described in the above embodiments may still be modified, or some of the technical features may be equivalently replaced. Such modifications or replacements do not cause the essence of the corresponding technical solutions to depart from the spirit and scope of the technical solutions of the embodiments of the present disclosure, and are intended to be included within the scope of the protection of the present disclosure.

What is claimed is:

1. A method for monitoring a scanning rod status, comprising:
   acquiring scanning information of a scanning rod, wherein the scanning rod is an intraoral implant scanning device; and
   updating and acquiring status information of the scanning rod based on the scanning information of the scanning rod to determine status of the scanning rod;
   wherein the acquiring the scanning information of the scanning rod comprises: scanning the scanning rod through a scanning apparatus in response to a scanning start instruction to acquire image information of the scanning rod; and the status information comprises: image quality information, and the updating and acquiring status information of the scanning rod based on the scanning information of the scanning rod comprises:

acquiring the image quality information of the scanning rod based on the image information of the scanning rod, comprises:

determining a gray value contrast between an identification point and a background region of the scanning rod in the image information, and determining the image clarity of the image information based on the gray value contrast; and determining smoothness of an edge line of the identification point of the scanning rod in the image information, and determining the image clarity of the image information based on the smoothness; and determining the image quality information of the scanning rod based on the image clarity;

wherein the determining the image clarity of the image information based on the gray value contrast and the smoothness comprises:

determining a first weight corresponding to the gray value contrast and a second weight corresponding to the smoothness;

determining a first product of the gray value contrast and the first weight, and a second product of the smoothness and the second weight; and taking a sum of the first product and the second product as a clarity value for representing the image clarity.

2. The method as claimed in claim 1, wherein the status information further comprises: image quality warning information; and the method further comprises:

sending the image quality warning information to a user if the image quality information indicates that the status of the scanning rod is abnormal in quality in a process of scanning the scanning rod; and displaying the image quality information and the image quality warning information after the scanning is completed.

3. The method as claimed in claim 1, wherein the acquiring the image quality information of the scanning rod based on the image information of the scanning rod comprises:

performing reconstruction based on the image information to obtain scanning rod three-dimensional data of the scanning rod; and determining the image quality information of the scanning rod based on the scanning rod three-dimensional data; and/or performing reconstruction based on the image information to obtain identification point three-dimensional data of the scanning rod; and determining the image quality information of the scanning rod based on the identification point three-dimensional data.

4. The method as claimed in claim 1, wherein the determining the image quality information of the scanning rod based on the image clarity comprises:

determining a first comparison result between the clarity value and a preset clarity threshold;

determining that the image quality information indicates that the scanning rod is normal in quality if the first comparison result indicates that the clarity value is greater than or equal to the clarity threshold; and determining that the image quality information indicates that the scanning rod is abnormal in quality if the first comparison result indicates that the clarity value is less than the clarity threshold.

5. The method as claimed in claim 3, wherein the determining the image quality information of the scanning rod based on the scanning rod three-dimensional data and the identification point three-dimensional data further comprises:

determining standard three-dimensional data corresponding to the scanning rod pre-stored in a scanning rod database, wherein the standard three-dimensional data comprises: standard scanning rod three-dimensional data for representing a surface profile of the scanning rod, and standard identification point three-dimensional data for representing an identification point of the scanning rod;

respectively comparing the scanning rod three-dimensional data with the standard scanning rod three-dimensional data, and the identification point three-dimensional data with the standard identification point three-dimensional data to obtain a three-dimensional coordinate deviation value; and determining the image quality information of the scanning rod based on the three-dimensional coordinate deviation value.

6. The method as claimed in claim 5, wherein the determining the image quality information of the scanning rod based on the three-dimensional coordinate deviation value comprises:

determining a second comparison result between the three-dimensional coordinate deviation value and a preset deviation value threshold;

determining that the image quality information indicates that the scanning rod is abnormal in quality if the second comparison result indicates that the three-dimensional coordinate deviation value is greater than or equal to the deviation value threshold; and determining that the image quality information indicates that the scanning rod is normal in quality if the second comparison result indicates that the three-dimensional coordinate deviation value is less than the deviation value threshold.

7. The method as claimed in claim 1, the method further comprises:

acquiring a use record of the scanning rod, wherein the use record is inputted by a user through an input device, acquired before the scanning rod is scanned and/or in a process of scanning the scanning rod;

acquiring use frequency of the scanning rod based on the use record; and determining the status information of the scanning rod based on the use frequency of the scanning rod.

8. The method as claimed in claim 7, wherein the determining the status information of the scanning rod based on the use frequency of the scanning rod comprises:

determining a first comparison result between the use frequency and a preset use frequency threshold;

determining that the status of the scanning rod is normal in quality if the first comparison result indicates that the use frequency is less than the preset use frequency threshold; and determining that the status of the scanning rod is abnormal in quality if the first comparison result indicates that the use frequency is greater than or equal to the preset use frequency threshold.

9. The method as claimed in claim 1, wherein the acquiring scanning information of the scanning rod further comprises:

regularly monitoring the scanning rod according to a preset self-check period through the scanning apparatus in response to a first instruction to obtain self-check scanning information, and updating and acquiring the status information of the scanning rod based on the self-check scanning information of the scanning rod to determine the status of the scanning rod, wherein the first instruction is used for indicating the scanning apparatus to monitor the status of the scanning rod based on a regular self-check mode.

10. The method as claimed in claim 9, wherein the acquiring scanning information of the scanning rod further comprises:

regularly monitoring the scanning rod according to a preset polling period through the scanning apparatus in response to a second instruction to obtain polling scanning information, wherein the second instruction is used for indicating the scanning apparatus to scan the scanning rod based on a regular polling mode, monitoring items of the regular polling mode are more than monitoring items corresponding to the regular self-check mode, and a monitoring period corresponding to the preset polling period is different from a monitoring period corresponding to the preset self-check period.

11. The method as claimed in claim 1, the method further comprises:

sending warning information to a user in a case that it is determined that the status of the scanning rod is abnormal in quality, wherein the abnormal in quality is used for representing that current status of the scanning rod does not reach a preset status standard.

12. The method as claimed in claim 1, the method further comprises:

setting a wear maintenance process based on the scanning rod, wherein the wear maintenance process is used for maintaining expected wear or faults of the scanning rod under preset conditions, and maintenance comprises at least one of the following: device detection, repair, replacement of parts, and replacement of the scanning rod; and triggering and starting the wear maintenance process in a case that it is determined that the status of the scanning rod is abnormal in quality.

13. The method as claimed in claim 1, the method further comprises:

displaying the status information through a client of a user in response to a status information display instruction of the user.

14. An electronic device, comprising a memory, a processor, and a computer program stored in the memory and configured to be run on the processor, the processor, when executing the computer program, is configured to:

acquire scanning information of a scanning rod, wherein the scanning rod is an intraoral implant scanning device; and update and acquire status information of the scanning rod based on the scanning information of the scanning rod to determine status of the scanning rod;

wherein the processor is further configured to: scan the scanning rod through a scanning apparatus in response to a scanning start instruction to acquire image information of the scanning rod; and the status information comprises: image quality information, and the processor is further configured to:

acquire the image quality information of the scanning rod based on the image information of the scanning rod;

the processor is further configured to:

determine a gray value contrast between an identification point and a background region of the scanning rod in the image information, and determine the image clarity of the image information based on the gray value contrast; and determine smoothness of an edge line of the identification point of the scanning rod in the image information, and determine the image clarity of the image information based on the smoothness; and determine the image quality information of the scanning rod based on the image clarity;

the processor is further configured to:

determine a first weight corresponding to the gray value contrast and a second weight corresponding to the smoothness;

determine a first product of the gray value contrast and the first weight, and a second product of the smoothness and the second weight; and take a sum of the first product and the second product as a clarity value for representing the image clarity.

15. The electronic device as claimed in claim 14, wherein the status information further comprises: image quality warning information; and the processor is further configured to:

send the image quality warning information to a user if the image quality information indicates that the status of the scanning rod is abnormal in quality in a process of scanning the scanning rod; and display the image quality information and the image quality warning information after the scanning is completed.

16. The electronic device as claimed in claim 14, wherein the processor is further configured to:

perform reconstruction based on the image information to obtain scanning rod three-dimensional data of the scanning rod; and determine the image quality information of the scanning rod based on the scanning rod three-dimensional data; and/or perform reconstruction based on the image information to obtain identification point three-dimensional data of the scanning rod; and determine the image quality information of the scanning rod based on the identification point three-dimensional data.

17. The electronic device as claimed in claim 14, wherein the processor is further configured to:

determine a first comparison result between the clarity value and a preset clarity threshold;

determine that the image quality information indicates that the scanning rod is normal in quality if the first comparison result indicates that the clarity value is greater than or equal to the clarity threshold; and determine that the image quality information indicates that the scanning rod is abnormal in quality if the first comparison result indicates that the clarity value is less than the clarity threshold.

18. The electronic device as claimed in claim 16, wherein the processor is further configured to:

determine standard three-dimensional data corresponding to the scanning rod pre-stored in a scanning rod database, wherein the standard three-dimensional data comprises: standard scanning rod three-dimensional data for representing a surface profile of the scanning rod, and standard identification point three-dimensional data for representing an identification point of the scanning rod;
respectively compare the scanning rod three-dimensional data with the standard scanning rod three-dimensional data, and the identification point three-dimensional data with the standard identification point three-dimensional data to obtain a three-dimensional coordinate deviation value; and
determine the image quality information of the scanning rod based on the three-dimensional coordinate deviation value.

19. The electronic device as claimed in claim 18, wherein the processor is further configured to:
determine a second comparison result between the three-dimensional coordinate deviation value and a preset deviation value threshold;
determine that the image quality information indicates that the scanning rod is abnormal in quality if the second comparison result indicates that the three-dimensional coordinate deviation value is greater than or equal to the deviation value threshold; and
determine that the image quality information indicates that the scanning rod is normal in quality if the second comparison result indicates that the three-dimensional coordinate deviation value is less than the deviation value threshold.

20. A non-transitory computer-readable storage medium, storing a computer program, the computer program, when executed by a processor, cause the processor to:
acquire scanning information of a scanning rod, wherein the scanning rod is an intraoral implant scanning device; and
update and acquire status information of the scanning rod based on the scanning information of the scanning rod to determine status of the scanning rod;
wherein the processor is further configured to: scan the scanning rod through a scanning apparatus in response to a scanning start instruction to acquire image information of the scanning rod; and
the status information comprises: image quality information, and the processor is further configured to:
acquire the image quality information of the scanning rod based on the image information of the scanning rod;
the processor is further configured to:
determine a gray value contrast between an identification point and a background region of the scanning rod in the image information, and determine the image clarity of the image information based on the gray value contrast; and
determine smoothness of an edge line of the identification point of the scanning rod in the image information, and determine the image clarity of the image information based on the smoothness; and
determine the image quality information of the scanning rod based on the image clarity;
the processor is further configured to:
determine a first weight corresponding to the gray value contrast and a second weight corresponding to the smoothness;
determine a first product of the gray value contrast and the first weight, and a second product of the smoothness and the second weight; and
take a sum of the first product and the second product as a clarity value for representing the image clarity.

* * * * *